(12) United States Patent
Czajkowski (10) Patent No.: US 9,795,116 B1
(45) Date of Patent: Oct. 24, 2017

(54) PET HAIR BRUSH

(71) Applicant: David Czajkowski, Myakke City, FL (US)

(72) Inventor: David Czajkowski, Myakke City, FL (US)

( * ) Notice: Subject to any disclaimer, the term of this patent is extended or adjusted under 35 U.S.C. 154(b) by 80 days.

(21) Appl. No.: 15/085,935

(22) Filed: Mar. 30, 2016

(51) Int. Cl.
*A01K 13/00* (2006.01)

(52) U.S. Cl.
CPC .................... *A01K 13/002* (2013.01)

(58) Field of Classification Search
CPC .... A01K 13/002; A01K 13/00; A01K 13/001; A46B 13/02; A46B 2200/1093
USPC ....... 119/619, 921, 603, 651, 615, 628, 664, 119/601, 602; 15/207.2, 1.52; 132/116, 132/112, 119.1, 120
See application file for complete search history.

(56) References Cited

U.S. PATENT DOCUMENTS

| | | | | |
|---|---|---|---|---|
| 4,362,173 A * | 12/1982 | Blinman | .............. | A01K 13/002 119/609 |
| 5,327,611 A * | 7/1994 | Balster | ..................... | A46B 5/00 15/160 |
| 6,477,732 B1 * | 11/2002 | Cline | ..................... | A45D 8/30 132/121 |
| 6,681,775 B2 * | 1/2004 | Wang | ..................... | A46B 17/06 132/119 |
| 7,316,045 B2 * | 1/2008 | Koke | ..................... | A46B 17/06 132/119 |
| 7,665,422 B2 * | 2/2010 | Kissel, Jr. | .............. | A01K 13/00 119/609 |
| 7,797,782 B2 * | 9/2010 | Davis | ..................... | A45D 24/00 15/143.1 |
| 8,132,541 B1 * | 3/2012 | Baer, Jr. | .............. | A01K 13/002 119/664 |
| 8,302,246 B2 * | 11/2012 | Chudzik | ................ | A46B 7/023 132/119 |
| 8,347,894 B1 * | 1/2013 | Stewart | .................. | A45D 24/28 132/114 |
| 8,353,077 B2 * | 1/2013 | Dyson | ..................... | A01K 13/00 15/369 |
| 8,499,403 B2 * | 8/2013 | Wang | ..................... | A46B 9/023 132/119 |
| 9,004,009 B2 * | 4/2015 | Kissel, Jr. | ............ | A01K 13/002 119/609 |
| 9,010,276 B1 * | 4/2015 | Nevitt | .................... | A45D 24/32 119/611 |

* cited by examiner

*Primary Examiner* — Yvonne Abbott-Lewis
(74) *Attorney, Agent, or Firm* — Justin Luby (57) ABSTRACT

An apparatus for brushing the hair of dogs and other animals. The apparatus comprises a hair brush with a depth guide that prevents the bristles from contacting the epidermis of the animal while its hair is brushed. Preventing the bristles from contacting the epidermis of the animal helps prevent injury and discomfort to the animal during grooming.

8 Claims, 8 Drawing Sheets

PET HAIR BRUSH

CROSS-REFERENCE TO RELATED APPLICATIONS

Not Applicable

FIELD OF THE INVENTION

The present invention relates to pet grooming products and more specifically a pet hair brush and/or rake that is designed to minimize discomfort to the pet while their hair is brushed.

BACKGROUND

Grooming is a vital part in the well-being and healthiness of a dog which can improve their lifespan. All breeds require daily grooming, how much depends on the breed, age, or health of the pet. Regular grooming helps to ensure the dog is healthy and comfortable. The main reasons for daily grooming include: 1) decreased chance of various skin problems, 2) general cleanliness of the dog, 3) monitoring of the dog's health by checking for cuts, heat, swelling, lameness, or changes in temperament, all of which could be indicative of illness, 4) forging of a closer bond between dog and owner, and 5) reducing infestation load of external parasites on skin.

Wire form pet brushes (often known as slickers) and rakes are often used to groom dogs and other pets and typically produce the best results. However, these grooming devices can oftentimes inflict harm and or pain upon the animals they are being used to groom. Wire form brushes and rakes come in constant contact with the epidermis layer of the pet's skin during grooming causing pain, irritations, scratches, and even punctures of the epidermis layer of the skin.

In addition to injuring the pets during grooming, the pain that is created by these brushes often leads to a pet resisting grooming, running away from the groomer and requiring the groomer to forcibly restrain the animal so that they can be groomed.

In order to help alleviate these issues, pet grooming devices are often equipped with plastic or metal beads at the extreme ends of the brush wires. These beads help distribute forces over the epidermis of the animal, reducing the discomfort. However, these beads can still create some discomfort in the animal because they are still in constant contact with the epidermis and because the beads can get tangled in the animal's hair, ripping the hair from the animal. Additionally, the plastic beads oftentimes fall off, creating frustration for the consumer.

Accordingly, there is a need for an apparatus that is operable to comfortably groom a dog or other pet without contacting the epidermis of the animal during the grooming process, creating pain or discomfort in the animal.

Additionally, there is a need for an apparatus that is more durable than the apparatuses currently available to comfortably groom dogs or other animals.

SUMMARY

It is the object of the present invention to provide an apparatus that can effectively groom a dog or other pet without inflicting pain upon the animal through the contact of the sharp brush or rake tips against the epidermis of the pet.

Another object of the present invention is to provide a pain free grooming apparatus which is more durable than products currently available.

The pet hair brush of the current invention is comprised of a brush with a handle, head, bristles, and a depth guide. The handle, head, and bristles of the pet hair brush are substantially similar to typical pet brushes (slickers and rakes) available today. However affixed to the head of the brush is a singular depth guide or plurality of guides, which protrude perpendicularly from the head of brush towards the animal.

The depth guide will protrude from the head of the brush, slightly beyond the tips of the brush bristles. The depth guide will function to create a small gap between the end of the epidermis of the animal being groomed and the tips of the brush.

The effect of the depth guide prevents the tips of the brush bristles from contacting the epidermis of the animal while being groomed. Eliminating contact between the tips of the brush bristles and the epidermis of the animal will prevent the irritation and injury that these bristles can inflict upon the animal during the grooming process.

Additionally, effectively preventing contact between the brush tips and the epidermis eliminates the need for beads at the tips of the bristles, making the brush more durable than its predecessors which utilized beaded bristles to minimize animal discomfort.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

DETAILED DESCRIPTION OF THE INVENTION AND PREFERRED EMBODIMENT

Figure 1:
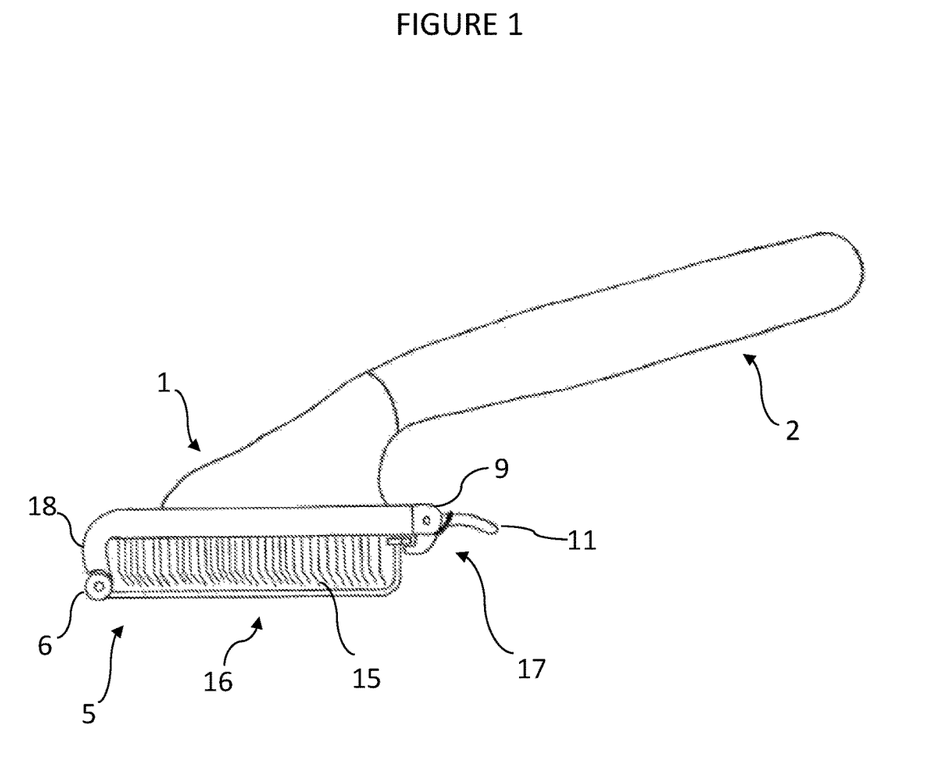
FIG. 1 illustrates a side view drawing of the pet hair brush.
Figure 3:
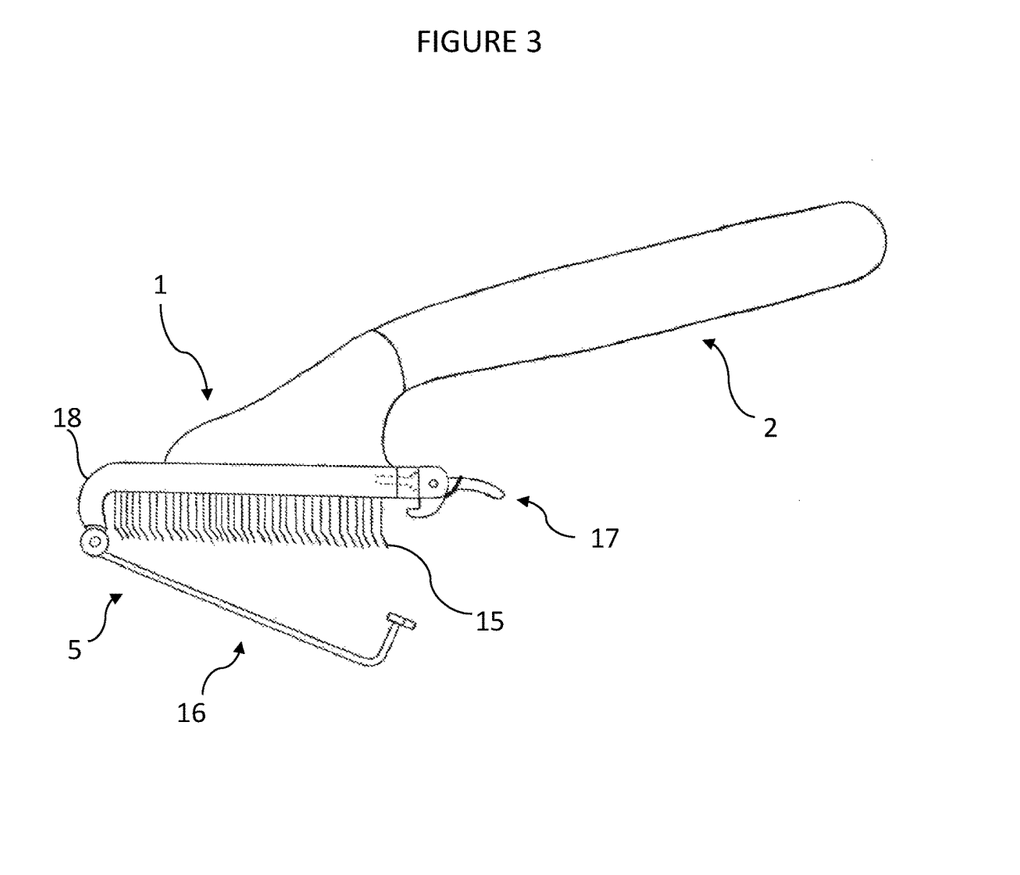
FIG. 3 illustrates a side view drawing of the pet hair brush with the depth guide opened for cleaning.

The invention is an apparatus for grooming an animal having a handle and brush head, the brush head having a plurality of bristles where the bristles are in general perpendicular orientation to the brush head, a depth guide, in general parallel orientation to the brush head and extending slightly beyond the tips of bristles, the depth guide able to rotate from a closed to an open position. Referring to FIG. 1, when it is in the closed position; and the depth guide creates a gap between the bristles and the epidermis of the animal being groomed. Referring to FIG. 3, when it is in the open position; and the depth guide can be moved out of the way to allow hair to be removed from the bristles of the brush head.

Figure 4:
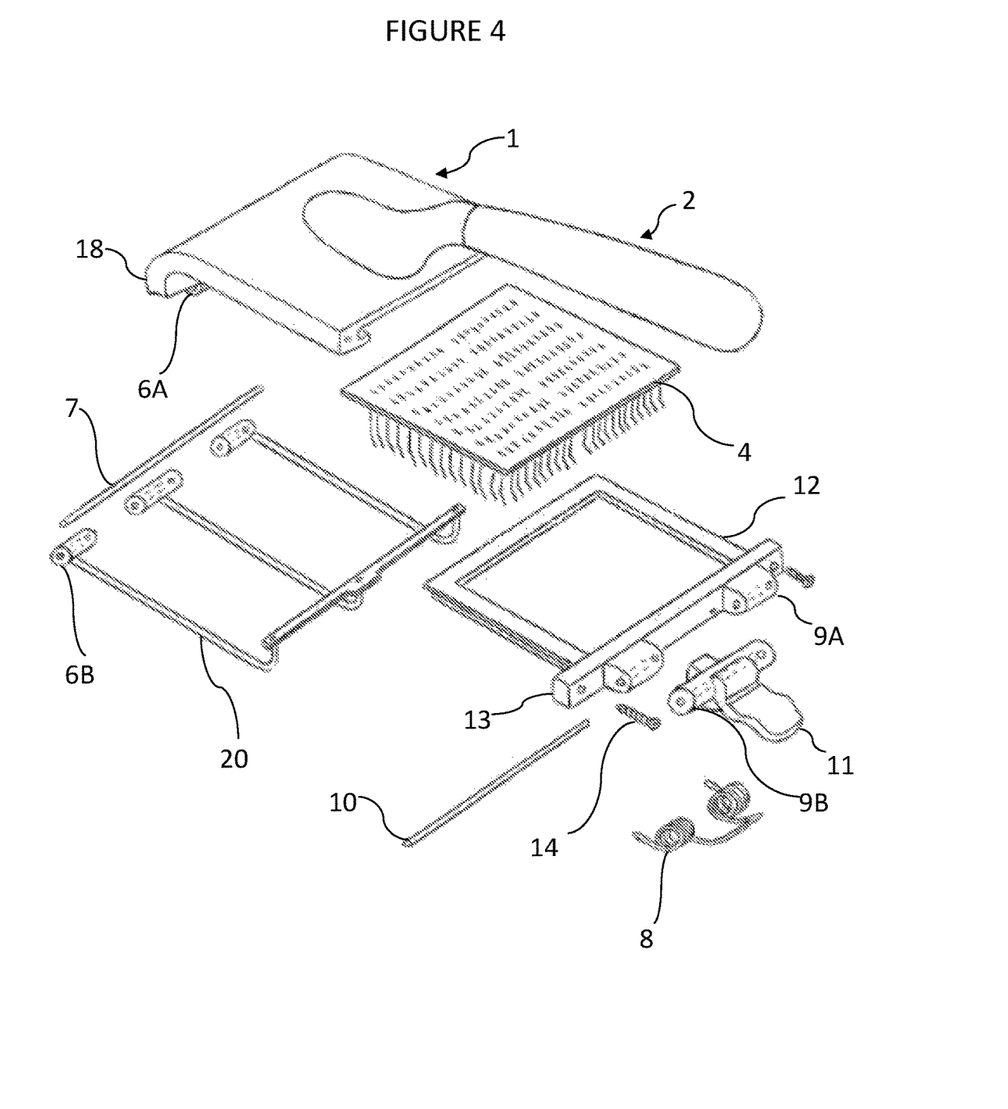
FIG. 4 illustrates an exploded perspective view drawing of the pet hair brush.

Referring to FIG. 4 the preferred embodiment of the apparatus is comprised of a brush head 1, a handle 2, a plurality of bristles affixed to a removable mat 4, a depth guide assembly 5, and a locking mechanism assembly 17, a frame for holding the bristle mat 12, a bracket for affixing the bristle mat frame and locking mechanism hinge to the brush head 13, and means for affixing the bracket to the brush head 14.

Referring to FIG. 4, in the preferred embodiment, the brush bristles 15 are affixed to a removable mat 4 that installed into a frame 12, and then affixed to the brush head, via the aforementioned bracket 13 and affixing means 14. This allows for replacement of the bristles for different styles of bristles (that way the owner can utilize one brush for multiple pets with different hairs), or replacement of the bristles if they become damaged without requiring replacement of the entire brush. While preferred, this feature of the brush is optional, and the bristles 15 can be affixed to the head of the brush 1 in any manner known to those skilled in the art.

Referring to FIG. 1, when in use, the depth guide assembly 5 is oriented so that the guide creates a small gap between the epidermis of the animal and the tips of the brush bristles 15. The small gap created by the depth guide assembly 5 prevents the bristles 15 from irritating or injuring the epidermis of the animal when the brush is pulled through the hair of the animal.

Figure 2:
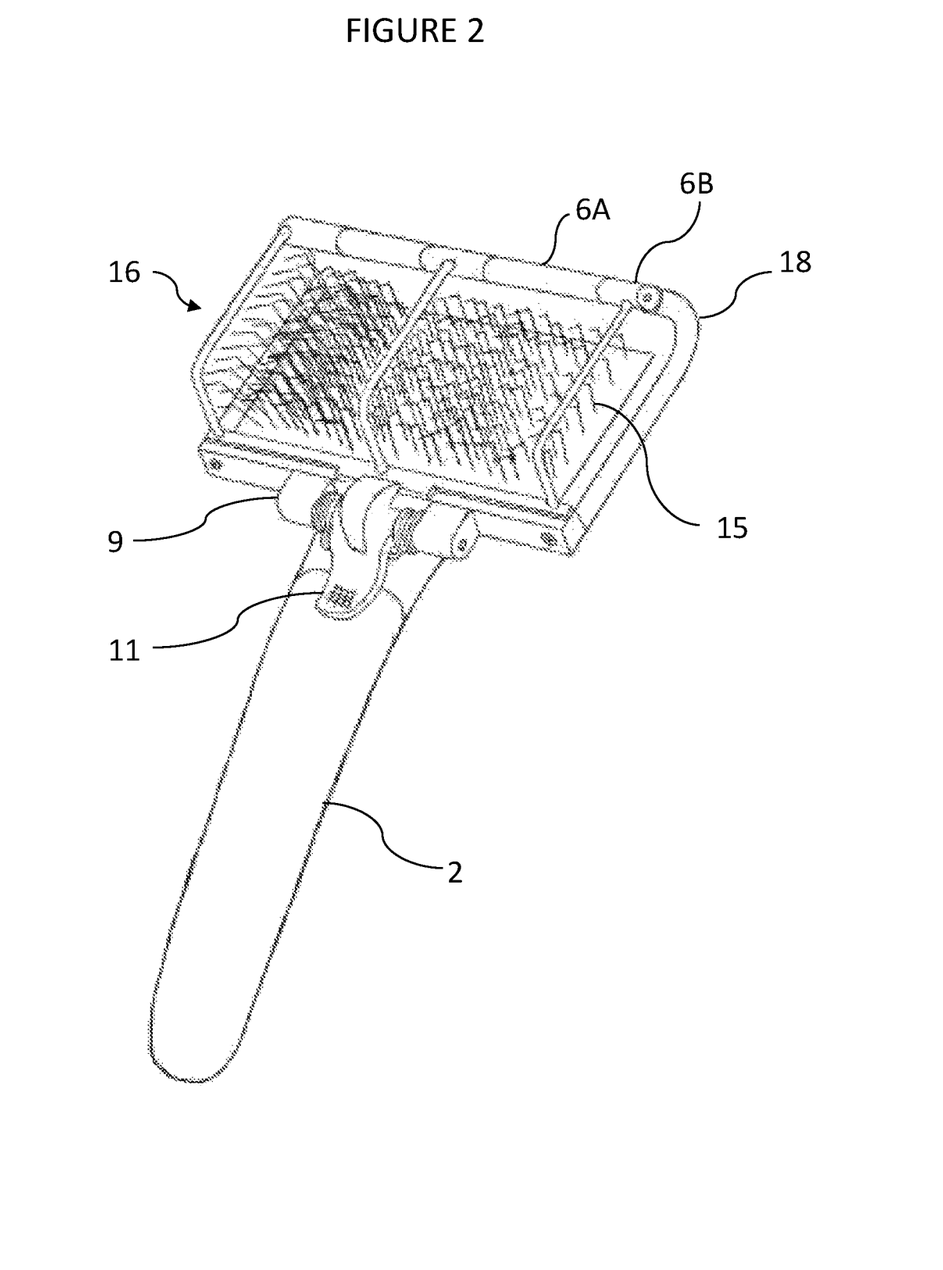
FIG. 2 illustrates a perspective view drawing of the underside of the pet hair brush.

Referring to FIGS. 2 and 4, in the preferred embodiment the depth guide assembly 5 is comprised of a depth guide gapping piece 18, depth guide hinge 6, a depth guide hinge pin 7, and a depth guide cage 16. The depth guide gapping piece 18 and protrudes perpendicular from the brush head 1 and is connected to the depth guide hinge 6A. The two are oriented so that the overall assembly of the two components protrudes slightly beyond the tips of the bristles 15. Attached to the depth guide hinge 6A is the adjoining depth guide hinge 6B, depth guide hinge pin 7, and a depth guide cage 16. The depth guide cage is comprised of three wires 20 that protrude from the depth guide hinge 6 located at the front of the head of the brush 1, and extend along the length of the head of the brush 1, parallel with the brush handle 2 until they reach the rear of the brush, until they reconnect with the locking mechanism hinge 9. While in the preferred embodiment the depth guide wires 20 are manufactured out of round wire, the wires could be manufactured out of any shape or material that will not irritate or injure the epidermis of the animal as it comes into contact and passes over the epidermis of the animal. Additionally, the number of wires 20 in the depth guide cage 16 could be altered to suit the desire of the user.

Referring to FIGS. 2, 3 and 4, located at the front of the brush head 1, and connected to the depth guide assembly guide 5 is a depth guide hinge 6A and 6B. The depth guide hinge 6A and 6B allows the depth guide assembly 5 to rotate out of the way of the way of the brush bristles 15 to allow easier removal of animal hair. While this is part of the preferred embodiment, the inclusion of this hinge feature is not critical to the functionality of the apparatus.

Referring to FIGS. 2, 3 and 4, located at the rear of the brush head 1, and connected to the depth guide cage 16 is a locking mechanism 17 comprised of a locking spring 8, hinge 9A and 9B, a locking mechanism hinge pin 10, push button release mechanism 11. The locking mechanism 17 serves to prevent the depth guide cage 16 from swinging open when the brush is in use, and allows for simple release of the depth guide cage 16 to allow it to rotate out of the way of the brush bristles 15 for cleaning. When the push button release mechanism 11 is depressed, it will rotate around the hinge 9, and is disengaged from the depth guide cage 16 allowing the depth guide cage 16 to pivot around the depth guide hinge 6.

Figure 5:
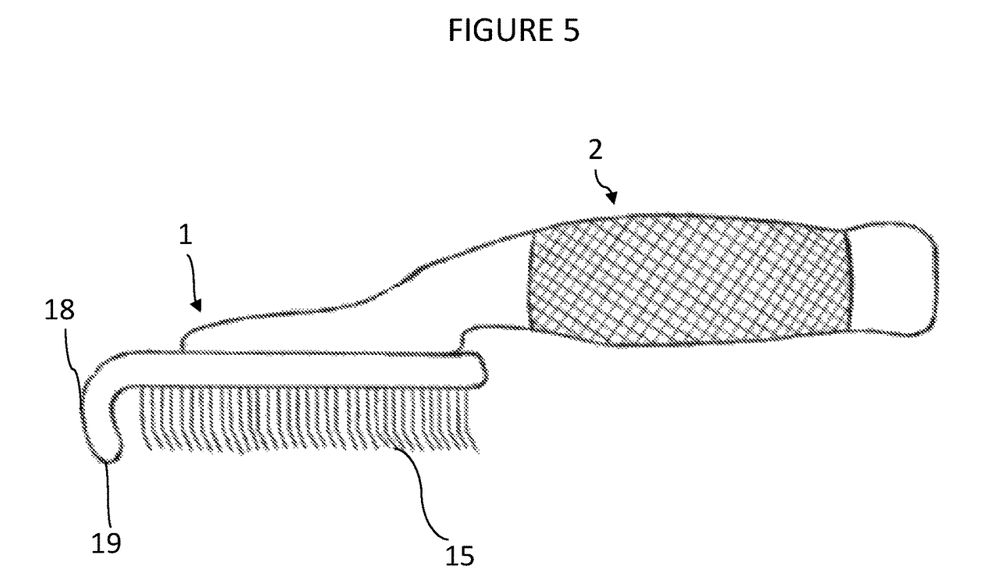
FIG. 5 illustrates a side view drawing of an alternate embodiment of the invention.
Figure 6:
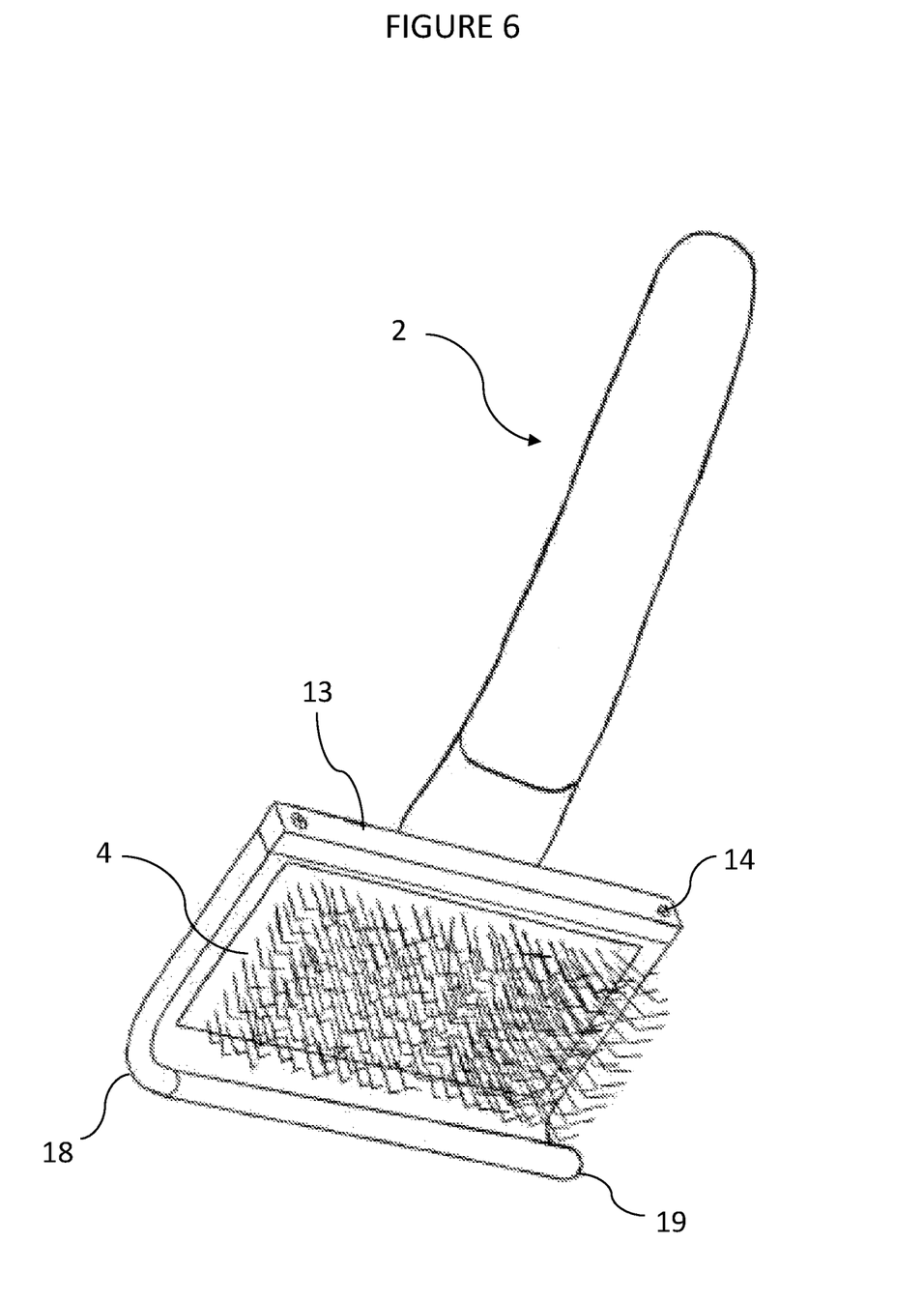
FIG. 6 illustrates a perspective view drawing of the alternate embodiment of the invention.

Referring to FIGS. 5 and 6, in an alternate embodiment of the invention, the depth guide gapping piece 18 is located at the front of the brush head 1, and protrudes perpendicular from the brush head 1 slightly beyond the tips of the bristles 15, at which point the end of the depth guide gapping piece 18 has a smooth rounded tip 19 that can comfortably glide over the epidermis of the animal during grooming.

Referring to FIGS. 5 and 6, in this alternate embodiment of the invention, the user will place the smooth tip 19 of the apparatus on the animal and will orient the handle 2 of the brush such that the tips of the bristles 15 effectively brush the hair, yet do not come into contact with the epidermis of the animal before pulling the brush through the hair of the animal. While this alternate embodiment is effective at preventing injury to the epidermis of the animal, when properly used, it is dependent upon the user to properly orient the brush, whereas, there is much less potential for user error with the preferred embodiment. However, this alternate embodiment could be manufactured and sold for a lower cost, and therefore, some users may prefer this embodiment.

Figure 7:
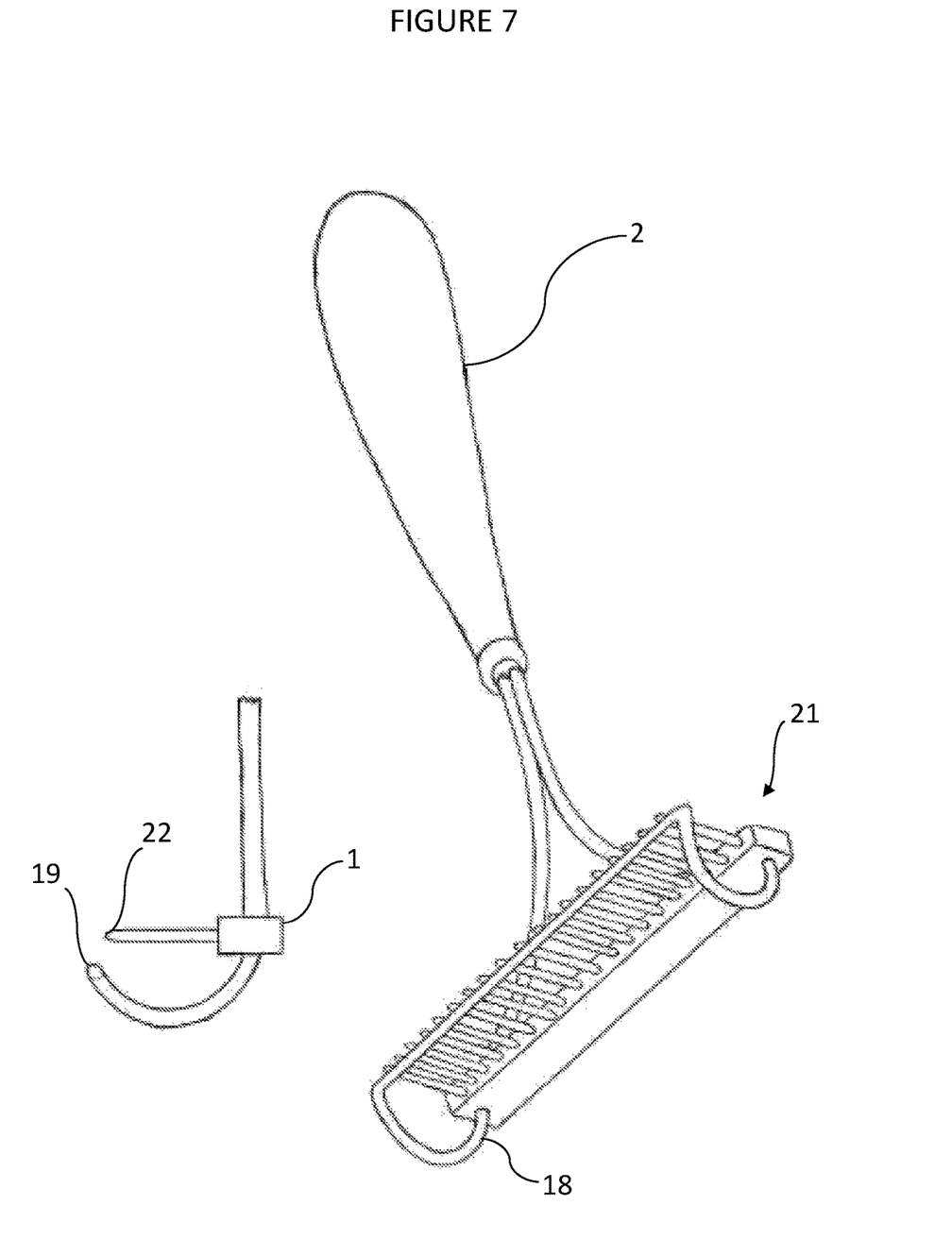
FIG. 7 illustrates a perspective view drawing of a second alternate embodiment of the invention.
Figure 8:
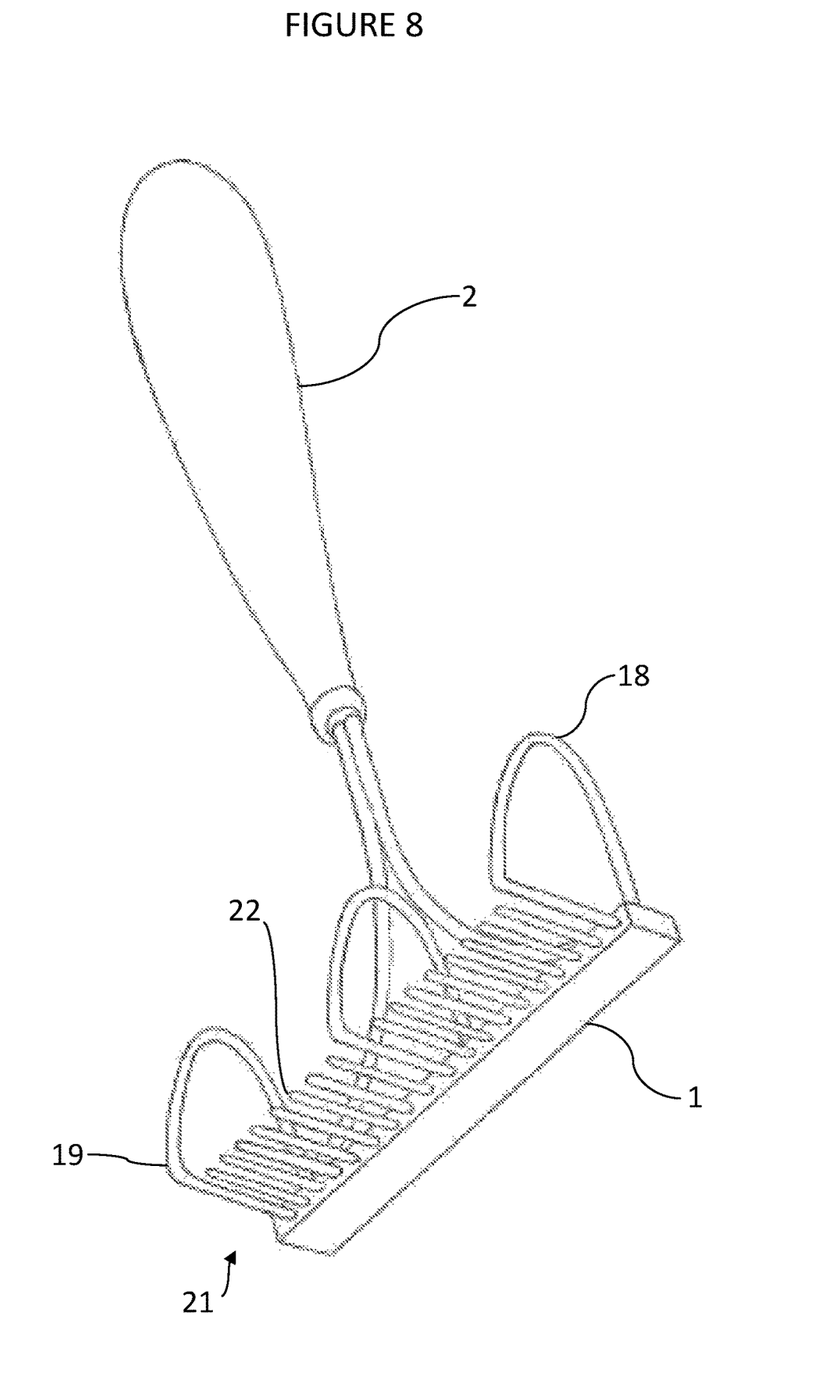
FIG. 8 illustrates a perspective view drawing of a third alternate embodiment of the invention.

Referring to FIGS. 7 and 8, in a second alternate embodiment of the invention, the brush bristles 15 are replaced with a rake 21. The depth guide gapping piece 18 is located at the front of the brush head 1, and protrudes perpendicular from the brush head 1 slightly beyond the tips of the rake tines 22, at which point the end of the depth guide gapping piece 18 has a smooth rounded tip 19 that can comfortably glide over the epidermis of the animal during grooming.

Materials for all parts of the present invention, including all described or extrapolated embodiments may be made from the following that include, but are not limited to: metals, plastics, or any composites of such materials. The various parts to the present invention may be manufactured from identical or different materials, combinations of materials, or composites of materials.

It would be appreciated by those skilled in the art that various changes and modifications can be made to the illustrated embodiments without departing from the spirit of the present invention. All such modifications and changes are intended to be covered by the appended claims.

What is claimed is:

1. A brush apparatus for grooming animal hair comprising:
    means for gripping and guiding the brush through the hair of the animal;
    means for grooming animal hair which when pulled through the hair removes tangles matting and/or debris that may be entangled in the animal's hair;
    a head member with means for affixing said gripping means and said means for grooming animal hair;
    one or more depth guides with upper and lower ends, the upper end of which protrudes downward from said head member and lower end extends beyond the tips of said grooming means;
    wherein said depth guide prevents said grooming means from contacting the epidermis of the animal as the user grasps the gripping means and guides the apparatus through the hair of the animal being groomed.

2. The apparatus of claim 1, wherein said depth guide further comprises:
  a cage assembly which affixes to the end of the depth guide and protrudes from the depth guide along the length of said head member;
  wherein said cage assembly prevents said grooming means from contacting the epidermis of the animal regardless of whether or not the user is properly orienting the apparatus during the grooming process.

3. The apparatus of claim 2, wherein said depth guide is connected to the cage assembly via hinged connection;
  wherein the hinged connection allows the cage assembly to be moved out the way of the grooming means to allow for simpler removal of animal hair by the user from the grooming means.

4. The apparatus of claim 3, wherein said apparatus further incorporates a locking mechanism located and affixed the opposite side is said head member as said hinged connection, whereas said locking mechanism latches to the opposite end of said cage assembly;
  wherein the locking mechanism prevents said hinged cage member from swinging open during the grooming process.

5. The apparatus of claim 4, wherein said grooming means comprises a plurality of brush bristles.

6. The apparatus of claim 1, wherein said grooming means comprises a plurality of brush bristles.

7. The apparatus of claim 1, wherein said grooming means comprises a hair rake.

8. A brush apparatus for grooming animal hair comprising:
  means for gripping and guiding the brush through the hair of the animal;
  a head member with top and bottom sides whereas said gripping means is affixed to the top side of said head member and a plurality of brush bristles are affixed to the bottom side of said head member;
  a depth guide with upper and lower ends, the upper end of which protrudes downward from the bottom side of said head member;
  a hinge member affixed to the bottom of said depth guide whereas the overall length of the depth guide and hinge member extends beyond the bottom tips of the brush bristles,
  a cage assembly which affixes to the hinge member and protrudes from the depth guide and hinge along the length of said head member;
  a locking mechanism located and affixed the opposite side is said head member as said hinged connection, whereas said locking mechanism latches to the opposite end of said cage assembly;
  wherein said apparatus prevent injury to the animal epidermis from the brush bristles during grooming.

* * * * *